United States Patent
Li et al.

(10) Patent No.: US 12,297,742 B2
(45) Date of Patent: May 13, 2025

(54) SAFETY CONTROL METHOD AND SYSTEM FOR GENERATOR OF GAS TURBINE POWER PLANT

(71) Applicant: Huaneng Taiyuan Dongshan Gas Turbine Cogeneration Co., LTD, Shanxi (CN)

(72) Inventors: Xianjiang Li, Shanxi (CN); Lingyun Xu, Shanxi (CN); Qinglong Kong, Shanxi (CN); Quansheng Liu, Shanxi (CN); Long Jia, Shanxi (CN); Jiajia Xu, Shanxi (CN); Xiaochao Zhang, Shanxi (CN)

(73) Assignee: Huaneng Taiyuan Dongshan Gas Turbine Cogeneration Co., LTD, Taiyuan (CN)

( * ) Notice: Subject to any disclaimer, the term of this patent is extended or adjusted under 35 U.S.C. 154(b) by 183 days.

(21) Appl. No.: 18/321,735

(22) Filed: May 22, 2023

(65) Prior Publication Data
US 2023/0383671 A1    Nov. 30, 2023

Related U.S. Application Data

(63) Continuation of application No. PCT/CN2022/129452, filed on Nov. 3, 2022.

(30) Foreign Application Priority Data

May 31, 2022   (CN) .......................... 202210505712.0

(51) Int. Cl.
*F01D 15/10*  (2006.01)
*H02P 9/00*   (2006.01)

(52) U.S. Cl.
CPC .............. *F01D 15/10* (2013.01); *H02P 9/006* (2013.01); *F05D 2220/76* (2013.01); *F05D 2270/02* (2013.01); *F05D 2270/303* (2013.01)

(58) Field of Classification Search
CPC ........ H02P 9/006; H02P 29/032; H02P 29/60; F01D 15/10; F05D 2270/00
See application file for complete search history.

(56) References Cited

U.S. PATENT DOCUMENTS

2004/0026929 A1*  2/2004  Rebsdorf .............. H02M 5/297
                                                    290/44
2009/0188227 A1   7/2009  Bellot et al.

FOREIGN PATENT DOCUMENTS

| CN | 101847908 A | 9/2010 |
| CN | 103369108 A | 10/2013 |
| CN | 111740673 A | 10/2021 |

* cited by examiner

*Primary Examiner* — Said Bouziane (57) ABSTRACT

Disclosed in the present invention is a safety control method for a generator of a gas turbine power plant. The method includes the following steps: acquiring a safe power-receiving range value of a load, determining an output voltage of the generator, acquiring a ratio of rated power of the generator to a rotational speed of the generator, and acquiring a temperature difference between an internal temperature and an external temperature of the generator. In the present invention, stable voltage output of the generator is ensured by controlling the rotational speed, the number of turns of an output coil winding and a torque output value of the generator, such that stability and safety of operation is improved, an energy utilization rate is improved, and great significance for energy conservation, emission reduction, and energy loss reduction is achieved.

4 Claims, 2 Drawing Sheets

SAFETY CONTROL METHOD AND SYSTEM FOR GENERATOR OF GAS TURBINE POWER PLANT

TECHNICAL FIELD

The present invention relates to the technical field of safety control over generators, and in particular to a safety control method and system for a generator of a gas turbine power plant.

BACKGROUND TECHNOLOGY

At present, with development and progress of science and technology, a generator has become an indispensable apparatus in daily life, and an application field of the generator also becomes very wide, such as mines, railways, field construction sites, road traffic maintenance and gas turbine power plants. When the generator is used for supplying power to a load, an output voltage and output power of the generator need to be strictly controlled to ensure safe and stable operation of the generator during power supply, and particularly, when the output voltage of the generator is too high or unstable, an entity portion of the generator and metal parts supporting an end portion are overheated, resulting in occurrence of safety accidents.

Currently, for a lot of gas turbine power plants, a closed-loop control manner is usually employed in a commonly used generator control apparatus for automatic control over a generator, and output power is adjusted by adjusting an amplitude of motion displacement. After power adjustment, an output voltage is adjusted by using voltage and current double closed-loop control, such that the output voltage is controlled within a safety range required by a load. However, for such a control method, serious damage to the generator is likely to be caused due to a high-amplitude current, a risk of damaging a power-receiving apparatus also exists, and waste of energy is also likely to be caused.

Therefore, how to provide a method capable of improving stability and safety of a generator of a gas turbine power plant while improving an energy utilization rate of the generator is a technical problem to be solved at present.

Summary of the Utility Model

A ratio F is calculated according to the following formula: $F=E/Bi$.

A ratio matrix F0 (F1, F2, F3, and F4) is preset, where F1 is a first preset ratio, F2 is a second preset ratio, F3 is a third preset ratio, F4 is a fourth preset ratio, and $F1<F2<F3<F4$.

A torque output value matrix G0 of a generator is preset, and G0 (G1, G2, G3, and G4) is set, where G1 is a first preset torque output value, G2 is a second preset torque output value, G3 is a third preset torque output value, G4 is a fourth preset torque output value, and $G1<G2<G3<G4$.

A torque output value of the generator is set according to a relationship between the ratio F and each preset ratio:
when $F<F1$, the first preset torque output value G1 is selected as the torque output value of the generator;
when $F1 \leq F<F2$, the second preset torque output value G2 is selected as the torque output value of the generator;
when $F2 \leq F<F3$, the third preset torque output value G3 is selected as the torque output value of the generator; and
when $F3 \leq F<F4$, the fourth preset torque output value G4 is selected as the torque output value of the generator.

In some examples of the present application, an internal temperature and an external temperature of the generator are acquired, a temperature difference between the internal temperature and the external temperature is calculated, and the torque output value of the generator is corrected according to the temperature difference.

The temperature difference T is determined, a temperature difference matrix T0 is preset, and T0 (T1, T2, T3, and T4) is set, where T1 is a first preset temperature difference, T2 is a second preset temperature difference, T3 is a third preset temperature difference, T4 is a fourth preset temperature difference, and $T1<T2<T3<T4$.

A torque output value correction coefficient matrix h of the generator is preset, and h (h1, h2, h3, and h4) is set, where h1 is a first preset torque output value correction coefficient, h2 is a second preset torque output value correction coefficient, h3 is a third preset torque output value correction coefficient, h4 is a fourth preset torque output value correction coefficient, and $1<h1<h2<h3<h4<1.8$.

The torque output value of the generator is corrected according to a relationship between the temperature difference T and each preset temperature difference:
when $T<T1$, the first preset torque output value correction coefficient h1 is selected to correct the first preset torque output value G1, and a corrected torque output value is $G1*h1$;
when $T1 \leq T<T2$, the second preset torque output value correction coefficient h2 is selected to correct the second preset torque output value G2, and a corrected torque output value is $G2*h2$;
when $T2 \leq T<T3$, the third preset torque output value correction coefficient h3 is selected to correct the third preset torque output value G3, and a corrected torque output value is $G3*h3$; and
when $T3 \leq T<T4$, the fourth preset torque output value correction coefficient h4 is selected to correct the fourth preset torque output value G4, and a corrected torque output value is $G4*h4$.

To achieve the above objective, the present invention provides a safety control system for a generator of a gas turbine power plant. The system includes:
a rotational speed establishment module configured to acquire a safe power-receiving range value of a load, and control a rotational speed of the generator according to the safe power-receiving range value;
an adjustment module configured to determine an output voltage of the generator based on the current rotational speed of the generator, and adjust the number of turns of an output coil winding of the generator based on the output voltage of the generator;
a torque output value establishment module configured to determine rated power of the generator, acquire a ratio of the rated power of the generator to the rotational speed of the generator, and obtain a torque output value of the generator according to the ratio; and
a correction module configured to acquire an internal temperature and an external temperature of the generator, calculate a temperature difference between the internal temperature and the external temperature, and adjust the torque output value of the generator according to the temperature difference.

In some examples of the present application, in the rotational speed establishment module, when the rotational speed of the generator is controlled according to the safe power-receiving range value of the load, a safe power-receiving range value A of the load is determined, a safe power-receiving range value matrix A0 is preset, and A0 (A1, A2, A3, and A4) is set, where A1 is a first preset safe power-receiving range value, A2 is a second preset safe power-receiving range value, A3 is a third preset safe power-receiving range value, A4 is a fourth preset safe power-receiving range value, and A1<A2<A3<A4.

A rotational speed matrix B0 of the generator is preset, and B0 (B1, B2, B3, and B4) is set, where B1 is a first preset rotational speed of the generator, B2 is a second preset rotational speed of the generator, B3 is a third preset rotational speed of the generator, B4 is a fourth preset rotational speed of the generator, and B1<B2<B3<B4.

The rotational speed of the generator is set according to a relationship between the safe power-receiving range value A of the load and each preset rotational speed of the generator:
- when A<A1, the first preset rotational speed B1 of the generator is selected as the rotational speed of the generator;
- when A1≤A<A2, the second preset rotational speed B2 of the generator is selected as the rotational speed of the generator;
- when A2≤A<A3, the third preset rotational speed B3 of the generator is selected as the rotational speed of the generator; and
- when A3≤A<A4, the fourth preset rotational speed B4 of the generator is selected as the rotational speed of the generator.

In some examples of the present application, in the adjustment module, when the number of turns of the output coil winding of the generator is adjusted according to the output voltage of the generator, the output voltage C of the generator is determined, an output voltage matrix C0 of the generator is preset, and C0 (C1, C2, C3, and C4) is set, where C1 is a first preset output voltage of the generator, C2 is a second preset output voltage of the generator, C3 is a third preset output voltage of the generator, C4 is a fourth preset output voltage of the generator, and C1<C2<C3<C4.

An output coil winding turn number matrix D0 of the generator is preset, and D0 (D1, D2, D3, and D4) is set, where D1 is a first preset output coil winding turn number, D2 is a second preset output coil winding turn number, D3 is a third preset output coil winding turn number, D4 is a fourth preset output coil winding turn number, and D1<D2<D3<D4.

The number of turns of the output coil winding of the generator is set according to a relationship between the output voltage C of the generator and each preset output voltage of the generator:
- when C<C1, the fourth preset output coil winding turn number D4 is selected as the number of turns of the output coil winding of the generator;
- when C1≤C<C2, the third preset output coil winding turn number D3 is selected as the number of turns of the output coil winding of the generator;
- when C2≤C<C3, the second preset output coil winding turn number D2 is selected as the number of turns of the output coil winding of the generator; and
- when C3≤C<C4, the first preset output coil winding turn number D1 is selected as the number of turns of the output coil winding of the generator.

In some examples of the present application, in the torque output value establishment module, rated power E of the generator is acquired, then the ratio F of the rated power E of the generator to the rotational speed of the generator is acquired, and the torque output value G of the generator is determined according to the ratio F.

After the $i^{th}$ preset rotational speed Bi of the generator is set as the rotational speed of the generator according to the relationship between the safe power-receiving range value A of the load and each preset rotational speed of the generator, i=1, 2, 3, and 4 in this case.

The ratio F is calculated according to the following formula: F=E/Bi.

A ratio matrix F0 (F1, F2, F3, and F4) is preset, where F1 is a first preset ratio, F2 is a second preset ratio, F3 is a third preset ratio, F4 is a fourth preset ratio, and F1<F2<F3<F4.

A torque output value matrix G0 of the generator is preset, and G0 (G1, G2, G3, and G4) is set, where G1 is a first preset torque output value, G2 is a second preset torque output value, G3 is a third preset torque output value, G4 is a fourth preset torque output value, and G1<G2<G3<G4.

The torque output value of the generator is set according to a relationship between the ratio F and each preset ratio:
- when F<F1, the first preset torque output value G1 is selected as the torque output value of the generator;
- when F1≤F<F2, the second preset torque output value G2 is selected as the torque output value of the generator;
- when F2≤F<F3, the third preset torque output value G3 is selected as the torque output value of the generator; and
- when F3≤F<F4, the fourth preset torque output value G4 is selected as the torque output value of the generator.

In some examples of the present application, in the correction module, an internal temperature and an external temperature of the generator are acquired, a temperature difference between the internal temperature and the external temperature is calculated, and the torque output value of the generator is corrected according to the temperature difference.

The temperature difference T is determined, a temperature difference matrix T0 is preset, and T0 (T1, T2, T3, and T4) is set, where T1 is a first preset temperature difference, T2 is a second preset temperature difference, T3 is a third preset temperature difference, T4 is a fourth preset temperature difference, and T1<T2<T3<T4.

A torque output value correction coefficient matrix h of the generator is preset, and h (h1, h2, h3, and h4) is set, where h1 is a first preset torque output value correction coefficient, h2 is a second preset torque output value correction coefficient, h3 is a third preset torque output value correction coefficient, h4 is a fourth preset torque output value correction coefficient, and 1<h1<h2<h3<h4<1.8.

The torque output value of the generator is corrected according to a relationship between the temperature difference T and each preset temperature difference:
- when T<T1, the first preset torque output value correction coefficient h1 is selected to correct the first preset torque output value G1, and a corrected torque output value is G1*h1;
- when T1≤T<T2, the second preset torque output value correction coefficient h2 is selected to correct the second preset torque output value G2, and a corrected torque output value is G2*h2;
- when T2≤T<T3, the third preset torque output value correction coefficient h3 is selected to correct the third preset torque output value G3, and a corrected torque output value is G3*h3; and
- when T3≤T<T4, the fourth preset torque output value correction coefficient h4 is selected to correct the fourth preset torque output value G4, and a corrected torque output value is G4*h4.

The present invention provides the safety control method and system for a generator of a gas turbine power plant. Compared with the prior art, the following beneficial effects are achieved:

According to the present invention, the safe power-receiving range value of the load is acquired, and the rotational speed of the generator is controlled according to the safe power-receiving range value. The output voltage of the generator is determined based on the current rotational speed of the generator, and the number of turns of the output coil winding of the generator is adjusted based on the output voltage of the generator. Moreover, the ratio of the rated power of the generator to the rotational speed of the generator is obtained, and the torque output value of the generator is obtained according to the ratio. The temperature difference between the internal temperature and the external temperature of the generator is acquired, and the torque output value of the generator is adjusted according to the temperature difference. In the present invention, by controlling the rotational speed, the number of turns of the output coil winding and the torque output value of the generator, the operation stability and safety of the generator are greatly improved, and the problem of large load of a generator component caused by unsafe operation of the generator is effectively solved. Moreover, waste of energy can be avoided by effectively controlling and adjusting the generator, such that the purposes of no pollution, greenness and environmental protection are achieved, an energy consumption manner is also changed, and the effects of energy conservation and emission reduction are achieved.

SPECIFIC EMBODIMENTS

The particular embodiments of the present invention will be further described in detail in combination with the accompanying drawings and the examples. The following examples are used for describing the present invention, but do not limit the scope of the present invention.

In the description of the present application, it needs to be understood the orientation or positional relationships indicated by the terms "center", "up", "down", "front", "rear", "left", "right", "vertical", "horizontal", "top", "bottom", "inside", "outside", etc. are based on the orientation or positional relationship shown in the accompanying drawings, are merely for facilitating the description of the present application and simplifying the description, rather than indicating or implying that a device or element referred to must have a particular orientation or be constructed and operated in a particular orientation, and therefore will not be interpreted as limiting the present application.

The terms "first" and "second" are for descriptive purposes only and are not to be construed as indicating or implying their relative importance or implicitly specifying the number of indicated technical features. Thus, a feature defined with "first" and "second" may explicitly or implicitly include one or more of the features. In the description of the present application, "plurality of" means two or more, unless otherwise specified.

In the description of the present application, it should be noted that, unless otherwise explicitly specified and defined, the terms "mounting", "connecting" and "connection" should be understood in a broad sense, for example, they may be a fixed connection, a detachable connection, or an integrated connection; may be a mechanical connection, or an electrical connection; and may be a direct connection, or an indirect connection via an intermediate medium, or communication inside two elements. For those of ordinary skill in the art, the specific meanings of the above terms in the present invention may be understood according to specific circumstances.

The preferred examples of the present invention are described below in combination with the accompanying drawings.

Figure 1:
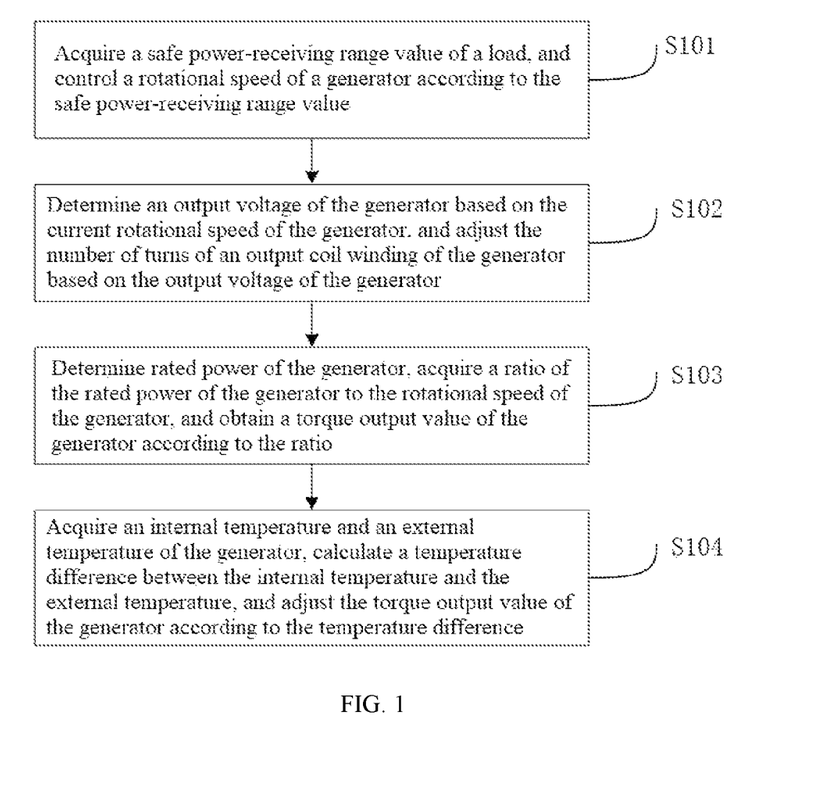
FIG. 1 shows a schematic flowchart of a safety control method for a generator of a gas turbine power plant in an example of the present invention.

As shown in FIG. 1, disclosed in the present invention is a safety control method for a generator of a gas turbine power plant. The method includes the following steps:

S101, acquire a safe power-receiving range value of a load, and control a rotational speed of a generator according to the safe power-receiving range value;

S102, determine an output voltage of the generator based on the current rotational speed of the generator, and adjust the number of turns of an output coil winding of the generator based on the output voltage of the generator;

S103, determine rated power of the generator, acquire a ratio of the rated power of the generator to the rotational speed of the generator, and obtain a torque output value of the generator according to the ratio; and S104, acquire an internal temperature and an external temperature of the generator, calculate a temperature difference between the internal temperature and the external temperature, and adjust the torque output value of the generator according to the temperature difference.

It should be noted that the safe power-receiving range value of the load is acquired in the present invention, and the rotational speed of the generator is controlled according to the safe power-receiving range value. The output voltage of the generator is determined based on the current rotational speed of the generator, and the number of turns of the output coil winding of the generator is adjusted based on the output voltage of the generator. The ratio of the rated power of the generator to the rotational speed of the generator is acquired, and the torque output value of the generator is obtained according to the ratio. The temperature difference between the internal temperature and the external temperature of the generator is acquired, and the torque output value of the generator is adjusted according to the temperature difference. In the present invention, by controlling the rotational speed, the number of turns of the output coil winding and the torque output value of the generator, the stable voltage output of the generator is ensured, stability and safety of operation of the generator are greatly improved, and the problem of large load of a generator component caused by unsafe operation of the generator is effectively solved. Moreover, waste of energy can be avoided by effectively controlling and adjusting the generator, such that the purposes of no pollution, greenness and environmental protection are achieved, and the purposes of energy consumption manner change, and energy conservation and emission reduction are also achieved.

In some examples of the present application, when the rotational speed of the generator is controlled according to the safe power-receiving range value of the load, a safe power-receiving range value A of the load is determined, a safe power-receiving range value matrix A0 is preset, and A0 (A1, A2, A3, and A4) is set, where A1 is a first preset safe power-receiving range value, A2 is a second preset safe power-receiving range value, A3 is a third preset safe power-receiving range value, A4 is a fourth preset safe power-receiving range value, and A1<A2<A3<A4.

A rotational speed matrix B0 of the generator is preset, and B0 (B1, B2, B3, and B4) is set, where B1 is a first preset rotational speed of the generator, B2 is a second preset rotational speed of the generator, B3 is a third preset rotational speed of the generator, B4 is a fourth preset rotational speed of the generator, and B1<B2<B3<B4.

The rotational speed of the generator is set according to a relationship between the safe power-receiving range value A of the load and each preset rotational speed of the generator:
when A<A1, the first preset rotational speed B1 of the generator is selected as the rotational speed of the generator;
when A1≤A<A2, the second preset rotational speed B2 of the generator is selected as the rotational speed of the generator;
when A2≤A<A3, the third preset rotational speed B3 of the generator is selected as the rotational speed of the generator; and
when A3≤A<A4, the fourth preset rotational speed B4 of the generator is selected as the rotational speed of the generator.

It should be noted that in order to enable the voltage output by the generator to be within the safe power-receiving range of the load, the rotational speed of the generator is set according to the relationship between the safe power-receiving range value of the load and each preset rotational speed of the generator in the present invention. The safe power-receiving range value of the load can be specifically set according to the load, and the generator may directly generate power to other apparatuses or charge a storage battery, such that the safe power-receiving range value is different, and can be set according to actual requirements, which is not specifically limited herein. When the output voltage required by the load is higher or lower, the rotational speed of the generator needs to be correspondingly increased or reduced, such that the voltage output by the generator is controlled to be within the safe power-receiving range value, and potential safety hazards caused by the fact that the output voltage is too high voltage or too low are avoided. In the present invention, the output voltage of the generator can be effectively controlled, stable operation of the generator is ensured, and the phenomenon of large load of a generator component caused by overlarge operation pressure of the generator is prevented. Moreover, by controlling the rotational speed of the generator, the phenomenon of energy waste during power generation of the generator can be avoided, a utilization rate of clean energy is effectively improved, and the purposes of no pollution and environmental protection are achieved.

In some examples of the present application, when the number of turns of the output coil winding of the generator is adjusted according to the output voltage of the generator, the output voltage C of the generator is determined, an output voltage matrix C0 of the generator is preset, and C0 (C1, C2, C3, and C4) is set, where C1 is a first preset output voltage of the generator, C2 is a second preset output voltage of the generator, C3 is a third preset output voltage of the generator, C4 is a fourth preset output voltage of the generator, and C1<C2<C3<C4.

An output coil winding turn number matrix D0 of the generator is preset, and D0 (D1, D2, D3, and D4) is set, where D1 is a first preset output coil winding turn number, D2 is a second preset output coil winding turn number, D3 is a third preset output coil winding turn number, D4 is a fourth preset output coil winding turn number, and D1<D2<D3<D4.

The number of turns of the output coil winding of the generator is set according to a relationship between the output voltage C of the generator and each preset output voltage of the generator:
when C<C1, the fourth preset output coil winding turn number D4 is selected as the number of turns of the output coil winding of the generator;
when C1≤C<C2, the third preset output coil winding turn number D3 is selected as the number of turns of the output coil winding of the generator;
when C2≤C<C3, the second preset output coil winding turn number D2 is selected as the number of turns of the output coil winding of the generator; and
when C3≤C<C4, the first preset output coil winding turn number D1 is selected as the number of turns of the output coil winding of the generator.

It should be noted that in order to further improve the stability of the generator, the number of turns of the output coil winding of the generator is set according to the relationship between the output voltage of the generator and each preset output voltage of the generator in the present invention. When the generator operates normally, too fast rotational speed may cause the output voltage of the generator to be too high, and the output voltage of the generator can be further stably controlled by adjusting the number of turns of the output coil winding of the generator, such that the generator has a safer and more stable working state. Moreover, by adjusting the number of turns of the output coil winding of the generator, an energy utilization rate can be effectively improved, and energy loss is reduced, which has great significance for development of modern new energy.

In some examples of the present application, rated power E of the generator is acquired, then a ratio F between the rated power E of the generator and the rotational speed of the generator is acquired, and a torque output value G of the generator is determined according to the ratio F.

After the $i^{th}$ preset rotational speed of the generator is set as the rotational speed Bi of the generator according to the relationship between the safe power-receiving range value A of the load and each preset rotational speed of the generator, i=1, 2, 3, and 4 in this case.

The ratio F is calculated according to the following formula: F=E/Bi.

A ratio matrix F0 (F1, F2, F3, and F4) is preset, where F1 is a first preset ratio, F2 is a second preset ratio, F3 is a third preset ratio, F4 is a fourth preset ratio, and F1<F2<F3<F4.

A torque output value matrix G0 of the generator is preset, and G0 (G1, G2, G3, and G4) is set, where G1 is a first preset torque output value, G2 is a second preset torque output value, G3 is a third preset torque output value, G4 is a fourth preset torque output value, and G1<G2<G3<G4.

The torque output value of the generator is set according to a relationship between the ratio F and each preset ratio:
when F<F1, the first preset torque output value G1 is selected as the torque output value of the generator;
when F1≤F<F2, the second preset torque output value G2 is selected as the torque output value of the generator;
when F2≤F<F3, the third preset torque output value G3 is selected as the torque output value of the generator; and
when F3≤F<F4, the fourth preset torque output value G4 is selected as the torque output value of the generator.

It should be noted that in order to ensure the normal power generation power of the generator, the rated power of the generator is acquired in the present invention, and the rated power of the generator can be obtained by calculating the product of an output current and the output voltage of the generator. It should be understood that the rated power of the generator can also be acquired by other manners, which is only illustrated by example and not specifically limited herein. The torque output value of the generator is set according to the ratio of the rated power of the generator to the rotational speed of the generator, and the torque output value of the generator is set according to the relationship between the ratio and each preset ratio, such that the normal power generation power of the generator can be effectively ensured, large fluctuation of power generation power of the generator is avoided, and the safety of the generator can also be effectively improved. Moreover, by adjusting the generator in real time, the purpose of changing an energy consumption manner is achieved, and effects of energy conservation and emission reduction are achieved.

In some examples of the present application, an internal temperature and an external temperature of the generator are acquired, a temperature difference between the internal temperature and the external temperature is calculated, and the torque output value of the generator is corrected according to the temperature difference.

The temperature difference T is determined, a temperature difference matrix T0 is preset, and T0 (T1, T2, T3, and T4) is set, where T1 is a first preset temperature difference, T2 is a second preset temperature difference, T3 is a third preset temperature difference, T4 is a fourth preset temperature difference, and T1<T2<T3<T4.

A torque output value correction coefficient matrix h of the generator is preset, and h (h1, h2, h3, and h4) is set, where h1 is a first preset torque output value correction coefficient, h2 is a second preset torque output value correction coefficient, h3 is a third preset torque output value correction coefficient, h4 is a fourth preset torque output value correction coefficient, and 1<h1<h2<h3<h4<1.8.

The torque output value of the generator is corrected according to a relationship between the temperature difference T and each preset temperature difference:

when T<T1, the first preset torque output value correction coefficient h1 is selected to correct the first preset torque output value G1, and a corrected torque output value is G1*h1;

when T1≤T<T2, the second preset torque output value correction coefficient h2 is selected to correct the second preset torque output value G2, and a corrected torque output value is G2*h2;

when T2≤T<T3, the third preset torque output value correction coefficient h3 is selected to correct the third preset torque output value G3, and a corrected torque output value is G3*h3; and when T3≤T<T4, the fourth preset torque output value correction coefficient h4 is selected to correct the fourth preset torque output value G4, and a corrected torque output value is G4*h4.

It should be noted that in order to further control the torque output value of the generator, the power generation power of the generator is more stable. In the present invention, the internal temperature of the generator is acquired, and then the external temperature of the generator is acquired. The internal temperature and the external temperature referred to herein may be a temperature of an inner wall of the generator and a temperature of an outer housing of the generator, and may also be other temperature signals, which are not specifically limited herein. Then, the temperature difference is calculated by means of the internal temperature and the external temperature, and the torque output value of the generator is corrected according to the relationship between the temperature difference and each preset temperature difference. The output power of the generator can be better controlled by correcting the torque output value of the generator, thereby ensuring the safe and stable operation of the generator.

Figure 2:
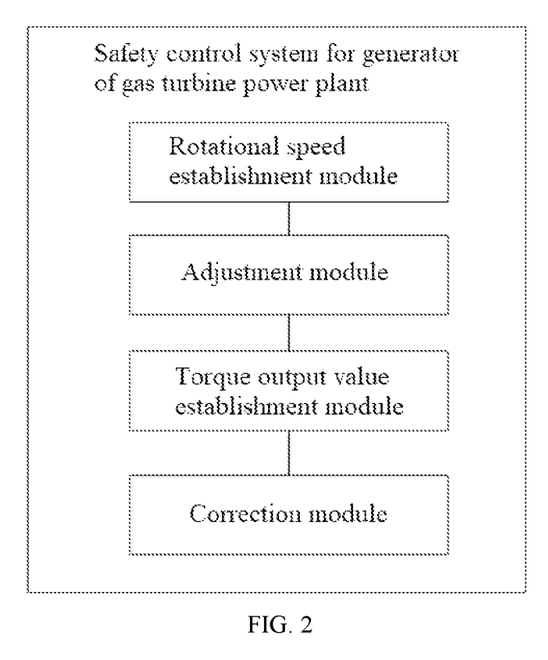
FIG. 2 shows a schematic structural diagram of a safety control system for a generator of a gas turbine power plant in an example of the present invention.

As shown in FIG. 2, disclosed in an example of the present invention is a safety control system for a generator of a gas turbine power plant. The system includes:
- a rotational speed establishment module configured to acquire a safe power-receiving range value of a load, and control a rotational speed of the generator according to the safe power-receiving range value;
- an adjustment module configured to determine an output voltage of the generator based on the current rotational speed of the generator, and adjust the number of turns of an output coil winding of the generator based on the output voltage of the generator;
- a torque output value establishment module configured to determine rated power of the generator, acquire a ratio of the rated power of the generator to the rotational speed of the generator, and obtain a torque output value of the generator according to the ratio; and
- a correction module configured to acquire an internal temperature and an external temperature of the generator, calculate a temperature difference between the internal temperature and the external temperature, and adjust the torque output value of the generator according to the temperature difference.

It should be noted that the safe power-receiving range value of the load is acquired in the present invention, and the rotational speed of the generator is controlled according to the safe power-receiving range value. The output voltage of the generator is determined based on the current rotational speed of the generator, and the number of turns of the output coil winding of the generator is adjusted based on the output voltage of the generator. The ratio of the rated power of the generator to the rotational speed of the generator is acquired, and the torque output value of the generator is obtained according to the ratio. The temperature difference between the internal temperature and the external temperature of the generator is acquired, and the torque output value of the generator is adjusted according to the temperature difference. In the present invention, the stable voltage output of the generator is ensured by controlling the rotational speed, the number of turns of the output coil winding and the torque output value of the generator, such that stability and safety of operation of the generator are greatly improved, and the problem of large load of a generator component caused by unsafe operation of the generator is effectively solved. Moreover, the phenomenon of energy waste of the generator during power generation can be avoided by controlling the rotational speed of the generator, a utilization rate of clean energy is effectively improved, and the purposes of no pollution and environmental protection are achieved.

In some examples of the present application, in the rotational speed establishment module, when the rotational speed of the generator is controlled according to the safe power-receiving range value of the load, a safe power-receiving range value A of the load is determined, a safe power-receiving range value matrix A0 is preset, and A0 (A1, A2, A3, and A4) is set, where A1 is a first preset safe power-receiving range value, A2 is a second preset safe power-receiving range value, A3 is a third preset safe power-receiving range value, A4 is a fourth preset safe power-receiving range value, and A1<A2<A3<A4.

A rotational speed matrix B0 of the generator is preset, and B0 (B1, B2, B3, and B4) is set, where B1 is a first preset rotational speed of the generator, B2 is a second preset rotational speed of the generator, B3 is a third preset rotational speed of the generator, B4 is a fourth preset rotational speed of the generator, and B1<B2<B3<B4.

The rotational speed of the generator is set according to a relationship between the safe power-receiving range value A of the load and each preset rotational speed of the generator:

when A<A1, the first preset rotational speed B1 of the generator is selected as the rotational speed of the generator;

when A1≤A<A2, the second preset rotational speed B2 of the generator is selected as the rotational speed of the generator;

when A2≤A<A3, the third preset rotational speed B3 of the generator is selected as the rotational speed of the generator; and when A3≤A<A4, the fourth preset rotational speed B4 of the generator is selected as the rotational speed of the generator.

It should be noted that in order to enable the voltage output by the generator to be within the safe power-receiving range of the load, the rotational speed of the generator is set according to the relationship between the safe power-receiving range value of the load and each preset rotational speed of the generator in the present invention. The safe power-receiving range value of the load can be specifically set according to the load, and the generator may directly generate power to other apparatuses or charge a storage battery, such that the safe power-receiving range value is different, and can be set according to actual requirements, which is not specifically limited herein. When the output voltage required by the load is higher or lower, the rotational speed of the generator needs to be correspondingly increased or reduced, such that the voltage output by the generator is controlled to be within the safe power-receiving range value, and potential safety hazards caused by the fact that the output voltage is too high voltage or too low are avoided. In the present invention, the output voltage of the generator can be effectively controlled, such that stable operation of the generator is ensured, and the phenomenon of large load of a generator component caused by overlarge operation pressure of the generator is prevented.

In some examples of the present application, in the adjustment module, the number of turns of the output coil winding of the generator is adjusted according to the output voltage of the generator, the output voltage C of the generator is determined, an output voltage matrix C0 of the generator is preset, and C0 (C1, C2, C3, and C4) is set, where C1 is a first preset output voltage of the generator, C2 is a second preset output voltage of the generator, C3 is a third preset output voltage of the generator, C4 is a fourth preset output voltage of the generator, and C1<C2<C3<C4.

An output coil winding turn number matrix D0 of the generator is preset, and D0 (D1, D2, D3, and D4) is set, where D1 is a first preset output coil winding turn number, D2 is a second preset output coil winding turn number, D3 is a third preset output coil winding turn number, D4 is a fourth preset output coil winding turn number, and D1<D2<D3<D4.

The number of turns of the output coil winding of the generator is set according to a relationship between the output voltage C of the generator and each preset output voltage of the generator:

when C<C1, the fourth preset output coil winding turn number D4 is selected as the number of turns of the output coil winding of the generator;

when C1≤C<C2, the third preset output coil winding turn number D3 is selected as the number of turns of the output coil winding of the generator;

when C2≤C<C3, the second preset output coil winding turn number D2 is selected as the number of turns of the output coil winding of the generator; and when C3≤C<C4, the first preset output coil winding turn number D1 is selected as the number of turns of the output coil winding of the generator.

It should be noted that in order to further improve the stability of the generator, the number of turns of the output coil winding of the generator is set according to the relationship between the output voltage of the generator and each preset output voltage of the generator in the present invention. When the generator operates normally, too fast rotational speed may cause the output voltage of the generator to be too high, and the output voltage of the generator can be further stably controlled by adjusting the number of turns of the output coil winding of the generator, such that the generator has a safer and more stable working state. Moreover, by adjusting the number of turns of the output coil winding of the generator, an energy utilization rate can be effectively improved, and energy loss is reduced, which has great significance for development of modern new energy.

In some examples of the present application, in the torque output value establishment module, rated power E of the generator is acquired, then the ratio F of the rated power E of the generator to the rotational speed of the generator is acquired, and the torque output value G of the generator is determined according to the ratio F.

After the $i^{th}$ preset rotational speed of the generator is set as the rotational speed Bi of the generator according to the relationship between the safe power-receiving range value A of the load and each preset rotational speed of the generator, i=1, 2, 3, and 4 in this case.

The ratio F is calculated according to the following formula: F=E/Bi.

A ratio matrix F0 (F1, F2, F3, and F4) is preset, where F1 is a first preset ratio, F2 is a second preset ratio, F3 is a third preset ratio, F4 is a fourth preset ratio, and F1<F2<F3<F4.

A torque output value matrix G0 of the generator is preset, and G0 (G1, G2, G3, and G4) is set, where G1 is a first preset torque output value, G2 is a second preset torque output value, G3 is a third preset torque output value, G4 is a fourth preset torque output value, and G1<G2<G3<G4.

The torque output value of the generator is set according to a relationship between the ratio F and each preset ratio:

when F<F1, the first preset torque output value G1 is selected as the torque output value of the generator;

when F1≤F<F2, the second preset torque output value G2 is selected as the torque output value of the generator;

when F2≤F<F3, the third preset torque output value G3 is selected as the torque output value of the generator; and when F3≤F<F4, the fourth preset torque output value G4 is selected as the torque output value of the generator.

It should be noted that in order to ensure the normal power generation power of the generator, the rated power of the generator is acquired in the present invention, and the rated power of the generator can be obtained by calculating the product of an output current and the output voltage of the generator. It should be understood that the rated power of the generator can also be acquired by other manners, which is only illustrated by example and not specifically limited herein. The torque output value of the generator is set according to the ratio of the rated power of the generator to the rotational speed of the generator, and the torque output value of the generator is set according to the relationship between the ratio and each preset ratio, such that the normal power generation power of the generator can be effectively ensured, deviation of power generation power of the generator is avoided, and the safety of the generator can also be effectively improved. Moreover, by adjusting the generator in real time, the purpose of changing an energy consumption manner is achieved, and effects of energy conservation and emission reduction are achieved.

In some examples of the present application, in the correction module, an internal temperature and an external temperature of the generator are acquired, a temperature difference between the internal temperature and the external temperature is calculated, and the torque output value of the generator is corrected according to the temperature difference.

The temperature difference T is determined, a temperature difference matrix T0 is preset, and T0 (T1, T2, T3, and T4) is set, where T1 is a first preset temperature difference, T2 is a second preset temperature difference, T3 is a third preset temperature difference, T4 is a fourth preset temperature difference, and T1<T2<T3<T4.

A torque output value correction coefficient matrix h of the generator is preset, and h (h1, h2, h3, and h4) is set, where h1 is a first preset torque output value correction coefficient, h2 is a second preset torque output value correction coefficient, h3 is a third preset torque output value correction coefficient, h4 is a fourth preset torque output value correction coefficient, and 1<h1<h2<h3<h4<1.8.

The torque output value of the generator is corrected according to a relationship between the temperature difference T and each preset temperature difference:
- when T<T1, the first preset torque output value correction coefficient h1 is selected to correct the first preset torque output value G1, and a corrected torque output value is G1*h1;
- when T1≤T<T2, the second preset torque output value correction coefficient h2 is selected to correct the second preset torque output value G2, and a corrected torque output value is G2*h2;
- when T2≤T<T3, the third preset torque output value correction coefficient h3 is selected to correct the third preset torque output value G3, and a corrected torque output value is G3*h3; and
- when T3≤T<T4, the fourth preset torque output value correction coefficient h4 is selected to correct the fourth preset torque output value G4, and a corrected torque output value is G4*h4.

It should be noted that in order to further control the torque output value of the generator, the power generation power of the generator is more stable. In the present invention, the internal temperature of the generator is acquired, and then the external temperature of the generator is acquired. The internal temperature and the external temperature referred to herein may be a temperature of an inner wall of the generator and a temperature of an outer housing of the generator, and may also be other temperature signals, which are not specifically limited herein. Then, the temperature difference is calculated by means of the internal temperature and the external temperature, and the torque output value of the generator is corrected according to the relationship between the temperature difference and each preset temperature difference. The output power of the generator can be better controlled by correcting the torque output value of the generator, thereby ensuring the safe and stable operation of the generator.

In conclusion, according to the examples of the present invention, the safe power-receiving range value of the load is acquired, and the rotational speed of the generator is controlled according to the safe power-receiving range value. The output voltage of the generator is determined based on the current rotational speed of the generator, and the number of turns of the output coil winding of the generator is adjusted based on the output voltage of the generator. The ratio of the rated power of the generator to the rotational speed of the generator is acquired, and the torque output value of the generator is obtained according to the ratio. The temperature difference between the internal temperature and the external temperature of the generator is acquired, and the torque output value of the generator is adjusted according to the temperature difference. In the present invention, the stable voltage output of the generator is ensured by controlling the rotational speed, the number of turns of the output coil winding and the torque output value of the generator, such that the stability and safety of operation of the generator are greatly improved, and the problem of large load of the generator component caused by unsafe operation of the generator is effectively solved. Moreover, the energy utilization rate is improved, and great significance for energy conservation, emission reduction, and energy loss reduction is achieved.

In the above description of the embodiments, the specific features, structures, materials or characteristics described may be combined in any one or more examples or instances in a suitable manner.

Although the present invention has been described hereinbefore with reference to the examples, various modifications may be made thereto and equivalents may be substituted for components thereof without departing from the scope of the present invention. In particular, as long as there is no structural conflict, the features of the examples disclosed by the present invention can be combined with each other in any manner, and the failure to fully describe these combinations in this description is merely for the sake of space omission and resource conservation. Therefore, the present invention is not limited to the particular examples disclosed herein, but includes all technical solutions falling within the scope of the claims.

Those of ordinary skill in the art should understand that the above descriptions are merely the preferred examples of the present invention and are not intended to limit the present invention. Although the present invention is described in detail with reference to the foregoing examples, those skilled in the art can still make modifications to the technical solutions described in various foregoing examples, or make equivalent replacement to a part of its technical features. Any modifications, equivalent replacements, improvements, etc. made within the spirit and principles of the present invention should be included within the protection scope of the present invention.

What is claimed is:

1. A safety control method for a generator of a gas turbine power plant, comprising the following steps:
    acquiring a safe power-receiving range value of a load, and controlling a rotational speed of the generator according to the safe power-receiving range value;
    determining an output voltage of the generator based on the current rotational speed of the generator, and adjusting the number of turns of an output coil winding of the generator based on the output voltage of the generator;
    determining rated power of the generator, acquiring a ratio of the rated power of the generator to the rotational speed of the generator, and obtaining a torque output value of the generator according to the ratio;

acquiring an internal temperature and an external temperature of the generator, calculating a temperature difference between the internal temperature and the external temperature, and adjusting the torque output value of the generator according to the temperature difference;

determining, when the rotational speed of the generator is controlled according to the safe power-receiving range value of the load, a safe power-receiving range value A of the load, presetting a safe power-receiving range value matrix A0, and setting A0 (A1, A2, A3, and A4), wherein A1 is a first preset safe power-receiving range value, A2 is a second preset safe power-receiving range value, A3 is a third preset safe power-receiving range value, A4 is a fourth preset safe power-receiving range value, and A1<A2<A3<A4;

presetting a rotational speed matrix B0 of the generator, and setting B0 (B1, B2, B3, and B4), wherein B1 is a first preset rotational speed of the generator, B2 is a second preset rotational speed of the generator, B3 is a third preset rotational speed of the generator, B4 is a fourth preset rotational speed of the generator, and B1<B2<B3<B4;

setting the rotational speed of the generator according to a relationship between the safe power-receiving range value A of the load and each preset rotational speed of the generator;

when A<A1, selecting the first preset rotational speed B1 of the generator as the rotational speed of the generator;

when A1≤A<A2, selecting the second preset rotational speed B2 of the generator as the rotational speed of the generator;

when A2≤A<A3, selecting the third preset rotational speed B3 of the generator as the rotational speed of the generator;

when A3≤A<A4, selecting the fourth preset rotational speed B4 of the generator as the rotational speed of the generator;

acquiring rated power E of the generator, then acquiring a ratio F between the rated power E of the generator and the rotational speed of the generator, and determining a torque output value G of the generator according to the ratio F, wherein after the $i^{th}$ preset rotational speed of the generator is set as the rotational speed Bi of the generator according to the relationship between the safe power-receiving range value A of the load and each preset rotational speed of the generator, i=1, 2, 3, and 4 in this case, and the ratio F is calculated according to the following formula: F=E/Bi;

presetting a ratio matrix F0 (F1, F2, F3, and F4), wherein F1 is a first preset ratio, F2 is a second preset ratio, F3 is a third preset ratio, F4 is a fourth preset ratio, and F1<F2<F3<F4;

presetting a torque output value matrix G0 of the generator, and setting G0 (G1, G2, G3, and G4), wherein G1 is a first preset torque output value, G2 is a second preset torque output value, G3 is a third preset torque output value, G4 is a fourth preset torque output value, and G1<G2<G3<G4;

setting the torque output value of the generator according to a relationship between the ratio F and each preset ratio:

when F<F1, selecting the first preset torque output value G1 as the torque output value of the generator;

when F1≤F<F2, selecting the second preset torque output value G2 as the torque output value of the generator;

when F2≤F<F3, selecting the third preset torque output value G3 as the torque output value of the generator;

when F3≤F<F4, selecting the fourth preset torque output value G4 as the torque output value of the generator;

acquiring an internal temperature and an external temperature of the generator, calculating a temperature difference between the internal temperature and the external temperature, and correcting the torque output value of the generator according to the temperature difference;

determining the temperature difference T, presetting a temperature difference matrix T0, and setting T0 (T1, T2, T3, and T4), wherein T1 is a first preset temperature difference, T2 is a second preset temperature difference, T3 is a third preset temperature difference, T4 is a fourth preset temperature difference, and T1<T2<T3<T4;

presetting a torque output value correction coefficient matrix h of the generator, and setting h (h1, h2, h3, and h4), wherein h1 is a first preset torque output value correction coefficient, h2 is a second preset torque output value correction coefficient, h3 is a third preset torque output value correction coefficient, h4 is a fourth preset torque output value correction coefficient, and 1<h1<h2<h3<h4<1.8;

correcting the torque output value of the generator according to a relationship between the temperature difference T and each preset temperature difference:

when T<T1, selecting the first preset torque output value correction coefficient h1 to correct the first preset torque output value G1, wherein a corrected torque output value is G1*h1;

when T1≤T<T2, selecting the second preset torque output value correction coefficient h2 to correct the second preset torque output value G2, wherein a corrected torque output value is G2*h2;

when T2≤T<T3, selecting the third preset torque output value correction coefficient h3 to correct the third preset torque output value G3, wherein a corrected torque output value is G3*h3; and when T3≤T<T4, selecting the fourth preset torque output value correction coefficient h4 to correct the fourth preset torque output value G4, wherein a corrected torque output value is G4*h4.

2. The safety control method for a generator of a gas turbine power plant according to claim 1, wherein when the number of turns of the output coil winding of the generator is adjusted according to the output voltage of the generator, the output voltage C of the generator is determined, an output voltage matrix C0 of the generator is preset, and C0 (C1, C2, C3, and C4) is set, wherein C1 is a first preset output voltage of the generator, C2 is a second preset output voltage of the generator, C3 is a third preset output voltage of the generator, C4 is a fourth preset output voltage of the generator, and C1<C2<C3<C4;

an output coil winding turn number matrix DO of the generator is preset, and DO (D1, D2, D3, and D4) is set, wherein D1 is a first preset output coil winding turn number, D2 is a second preset output coil winding turn number, D3 is a third preset output coil winding turn number, D4 is a fourth preset output coil winding turn number, and D1<D2<D3<D4;

the number of turns of the output coil winding of the generator is set according to a relationship between the output voltage C of the generator and each preset output voltage of the generator:

when $C<C1$, the fourth preset output coil winding turn number D4 is selected as the number of turns of the output coil winding of the generator;

when $C1 \leq C<C2$, the third preset output coil winding turn number D3 is selected as the number of turns of the output coil winding of the generator;

when $C2 \leq C<C3$, the second preset output coil winding turn number D2 is selected as the number of turns of the output coil winding of the generator; and when $C3 \leq C<C4$, the first preset output coil winding turn number D1 is selected as the number of turns of the output coil winding of the generator.

3. A safety control system for a generator of a gas turbine power plant, comprising:

a rotational speed establishment module configured to acquire a safe power-receiving range value of a load, and control a rotational speed of the generator according to the safe power-receiving range value;

an adjustment module configured to determine an output voltage of the generator based on the current rotational speed of the generator, and adjust the number of turns of an output coil winding of the generator based on the output voltage of the generator;

a torque output value establishment module configured to determine rated power of the generator, acquire a ratio of the rated power of the generator to the rotational speed of the generator, and obtain a torque output value of the generator according to the ratio; and a correction module configured to acquire an internal temperature and an external temperature of the generator, calculate a temperature difference between the internal temperature and the external temperature, and adjust the torque output value of the generator according to the temperature difference, wherein in the rotational speed establishment module, when the rotational speed of the generator is controlled according to the safe power-receiving range value of the load, a safe power-receiving range value A of the load is determined, a safe power-receiving range value matrix A0 is preset, and A0 (A1, A2, A3, and A4) is set, wherein A1 is a first preset safe power-receiving range value, A2 is a second preset safe power-receiving range value, A3 is a third preset safe power-receiving range value, A4 is a fourth preset safe power-receiving range value, and $A1<A2<A3<A4$;

a rotational speed matrix B0 of the generator is preset, and B0 (B1, B2, B3, and B4) is set, wherein B1 is a first preset rotational speed of the generator, B2 is a second preset rotational speed of the generator, B3 is a third preset rotational speed of the generator, B4 is a fourth preset rotational speed of the generator, and $B1<B2<B3<B4$;

the rotational speed of the generator is set according to a relationship between the safe power-receiving range value A of the load and each preset rotational speed of the generator:

when $A<A1$, the first preset rotational speed B1 of the generator is selected as the rotational speed of the generator;

when $A1 \leq A<A2$, the second preset rotational speed B2 of the generator is selected as the rotational speed of the generator;

when $A2 \leq A<A3$, the third preset rotational speed B3 of the generator is selected as the rotational speed of the generator;

when $A3 \leq A<A4$, the fourth preset rotational speed B4 of the generator is selected as the rotational speed of the generator;

in the torque output value establishment module, rated power E of the generator is acquired, then a ratio F between the rated power E of the generator and the rotational speed of the generator is acquired, and a torque output value G of the generator is determined according to the ratio F;

after the $i^{th}$ preset rotational speed of the generator is set as the rotational speed Bi of the generator according to the relationship between the safe power-receiving range value A of the load and each preset rotational speed of the generator, i=1, 2, 3, and 4 in this case, and the ratio F is calculated according to the following formula: $F=E/Bi$;

a ratio matrix F0 (F1, F2, F3, and F4) is preset, wherein F1 is a first preset ratio, F2 is a second preset ratio, F3 is a third preset ratio, F4 is a fourth preset ratio, and $F1<F2<F3<F4$;

a torque output value matrix G0 of the generator is preset, and G0 (G1, G2, G3, and G4) is set, wherein G1 is a first preset torque output value, G2 is a second preset torque output value, G3 is a third preset torque output value, G4 is a fourth preset torque output value, and $G1<G2<G3<G4$;

the torque output value of the generator is set according to a relationship between the ratio F and each preset ratio:

when $F<F1$, the first preset torque output value G1 is selected as the torque output value of the generator;

when $F1 \leq F<F2$, the second preset torque output value G2 is selected as the torque output value of the generator;

when $F2 \leq F<F3$, the third preset torque output value G3 is selected as the torque output value of the generator;

when $F3 \leq F<F4$, selecting the fourth preset torque output value G4 as the torque output value of the generator;

in the correction module, an internal temperature and an external temperature of the generator are acquired, a temperature difference between the internal temperature and the external temperature is calculated, and the torque output value of the generator is corrected according to the temperature difference;

the temperature difference T is determined, a temperature difference matrix T0 is preset, and T0 (T1, T2, T3, and T4) is set, wherein T1 is a first preset temperature difference, T2 is a second preset temperature difference, T3 is a third preset temperature difference, T4 is a fourth preset temperature difference, and $T1<T2<T3<T4$;

a torque output value correction coefficient matrix h of the generator is preset, and h (h1, h2, h3, and h4) is set, wherein h1 is a first preset torque output value correction coefficient, h2 is a second preset torque output value correction coefficient, h3 is a third preset torque output value correction coefficient, h4 is a fourth preset torque output value correction coefficient, and $1<h1<h2<h3<h4<1.8$;

the torque output value of the generator is corrected according to a relationship between the temperature difference T and each preset temperature difference:

when $T<T1$, the first preset torque output value correction coefficient h1 is selected to correct the first preset torque output value G1, and a corrected torque output value is $G1*h1$;

when $T1 \leq T<T2$, the second preset torque output value correction coefficient h2 is selected to correct the second preset torque output value G2, and a corrected corrected torque output value is G2*h2;

when $T2 \leq T < T3$, the third preset torque output value correction coefficient h3 is selected to correct the third preset torque output value G3, and a corrected torque output value is G3*h3; and when $T3 \leq T < T4$, the fourth preset torque output value correction coefficient h4 is selected to correct the fourth preset torque output value G4, and a corrected torque output value is G4*h4.

4. The safety control system for a generator of a gas turbine power plant according to claim 3, wherein in the adjustment module, when the number of turns of the output coil winding of the generator is adjusted according to the output voltage of the generator, the output voltage C of the generator is determined, an output voltage matrix C0 of the generator is preset, and C0 (C1, C2, C3, and C4) is set, wherein C1 is a first preset output voltage of the generator, C2 is a second preset output voltage of the generator, C3 is a third preset output voltage of the generator, C4 is a fourth preset output voltage of the generator, and C1<C2<C3<C4;

an output coil winding turn number matrix DO of the generator is preset, and DO (D1, D2, D3, and D4) is set, wherein D1 is a first preset output coil winding turn number, D2 is a second preset output coil winding turn number, D3 is a third preset output coil winding turn number, D4 is a fourth preset output coil winding turn number, and D1<D2<D3<D4;

the number of turns of the output coil winding of the generator is set according to a relationship between the output voltage C of the generator and each preset output voltage of the generator:

when C<C1, the fourth preset output coil winding turn number D4 is selected as the number of turns of the output coil winding of the generator;

when $C1 \leq C < C2$, the third preset output coil winding turn number D3 is selected as the number of turns of the output coil winding of the generator;

when $C2 \leq C < C3$, the second preset output coil winding turn number D2 is selected as the number of turns of the output coil winding of the generator; and when $C3 \leq C < C4$, the first preset output coil winding turn number D1 is selected as the number of turns of the output coil winding of the generator.

* * * * *